Sept. 2, 1930.  S. J. STRID  1,774,678

PIPE ANCHOR DEVICE

Filed Jan. 25, 1929

Inventor
Sven J. Strid
By Gillson, Mannsley Attys.

Patented Sept. 2, 1930

1,774,678

UNITED STATES PATENT OFFICE

SVEN J. STRID, OF CHICAGO, ILLINOIS, ASSIGNOR TO T & S CORPORATION, A CORPORATION OF ILLINOIS

PIPE-ANCHOR DEVICE

Application filed January 25, 1929. Serial No. 334,904.

This invention relates to pipe holders or anchoring devices.

One of the objects of the invention is the provision of a new and improved pipe anchor member having novel means for attaching the same to a pipe.

Another object of the invention is the provision of a novel pipe clamp for applying the same to a pipe.

A still further object of the invention is the provision of a new and improved pipe clamp and supporting device that is cheap to manufacture, easily assembled, readily attached to a pipe and that will firmly grip and retain a pipe in adjusted position.

Other and further objects and advantages of the invention will appear from the following description taken in connection with the accompanying drawings, in which Fig. 1 is a side elevation of a portion of the pipe support showing the anchoring means in position thereon with parts in section and parts broken away;

Figure 1:
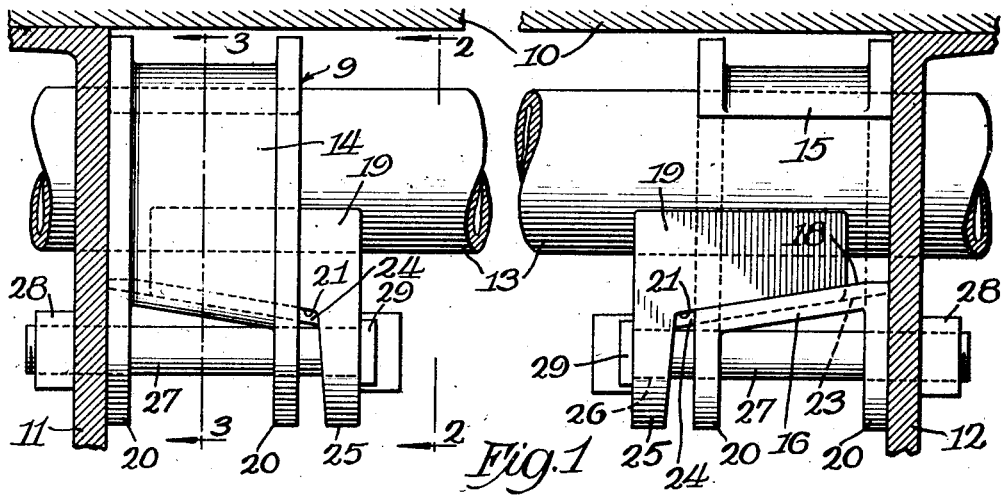
Figure 2:
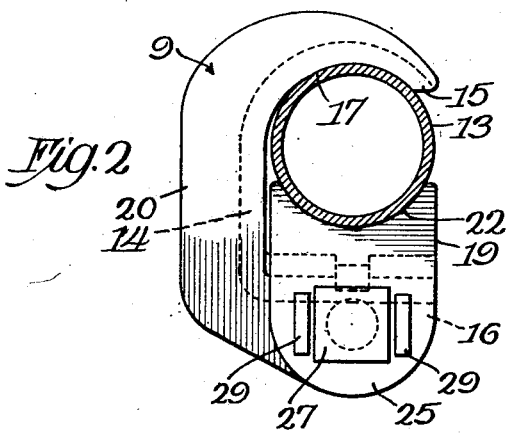
Fig. 2 is a section on the line 2—2 of Fig. 1.
Figure 3:
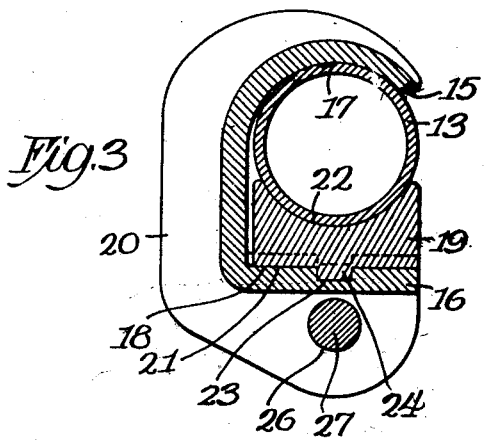
Fig. 3 is a section on the line 3—3 of Fig. 1.

In anchoring air and steam pipes to the underframes of railway cars, it is the common practice to provide anchoring devices or clamping members having a line contact with the pipe at least on one side of the pipe. This arrangement is objectionable because the inertia of the pipe due to the sudden starting and stopping of the car has a tendency to cause the loosening of the clamp either by slightly distorting the pipe or by wear on the limited area occupied by the clamp. The present invention seeks to eliminate this difficulty by arranging the wedge member so that it extends longitudinally of the pipe thereby greatly extending the contact surface between the wedge and pipe.

The anchoring devices usually employed necessitate placing the clamp in position from the end of the pipe. This is objectionable because of the great difficulty in applying and replacing such devices after the pipes have been assembled in position. The present invention has for its principal object the provision of a clamp or anchoring device that may be readily applied from the side of the pipe without disengaging any portion of the same from its assembly.

Referring now to the drawings, the reference character 10 designates a supporting member such for instance as the underframing of a railway car and 11 and 12 designate pipe supports rigidly attached thereto for supporting a pipe 13. The pipe 13 may be the brake pipe of the conventional air brake system.

Means are provided for rigidly connecting the pipe 13 to the supports 11 and 12. In the form of construction disclosed, which is by way of example only, this means comprises a plurality of clamps or anchor members 9 which are adapted to be clamped to the pipe and rigidly attached to the supports 11 and 12. As shown each clamp comprises a body portion 14, which is provided with laterally extending arms 15 and 16. Preferably, though not necessarily the clamp is provided with reinforcing flanges 20 extending along the body and arms. One of the arms, as 15, is provided with a concave surface forming a seat 17 against which the pipe 13 is adapted to be clamped. The other arm 16 is provided with an inclined or wedging face 18 on which wedge member 19 is adapted to engage. The wedge member 19 is provided with an inclined surface or wedging face 21 on one side, and on the opposite side, with a concave surface 22 which is adapted to form a seat for engaging the pipe 13 opposite the seat 17 on the arm 15. Preferably, though not necessarily, the wedge and inclined surface 18 are provided with inter-engaging members forming a guide for the wedge. As shown, the inclined surface 18 is provided with a groove 23 which is adapted to receive a corresponding tongue 24 on the inclined surface 21 of the wedge 19.

Suitable means are provided for forcing the wedge between the pipe 13 and the arm 16. As shown, the wedge 19 is provided with lateral extension 25 which is apertured at 26 for receiving a bolt 27. The flanges 20 and the support 11 or 12 are provided with alined openings through which the bolt 27 extends for connecting the clamp members to said supports. The bolt is provided with the usual nut 28 which is utilized for forcing the wedge into its clamping position.

The wedge 19 is preferably provided with one or more lugs 29 for engaging the head of the bolt for preventing turning thereof.

When it is desirable to anchor a pipe to its support, the wedge members 19 are removed from the clamps to permit the clamps to be placed in position on the pipe, the ends of the arms 15 and 16 being sufficiently spaced to permit the pipe to be introduced between the same. After the pipe has been seated in the concave surface 17, the wedge and clamping bolt are placed in position and by means of a wrench, the wedge is forced between the arm 16 and the pipe to cause the pipe to firmly engage its seat 17.

In the use of these clamp members for anchoring pipes to moving supports, such for instance as securing brake pipes beneath railway cars, the clamps are so arranged that the wedge members will be positioned alternately in opposite directions, as shown in Fig. 1 of the drawing. By means of this arrangement, the inertia of the pipe in one direction will cause certain of the wedges to more firmly grip the pipe and when inertia of the pipe is in the opposite direction, the remaining wedges will be caused to more firmly grip the pipe to resist longitudinal movement of the same.

Figure 4:
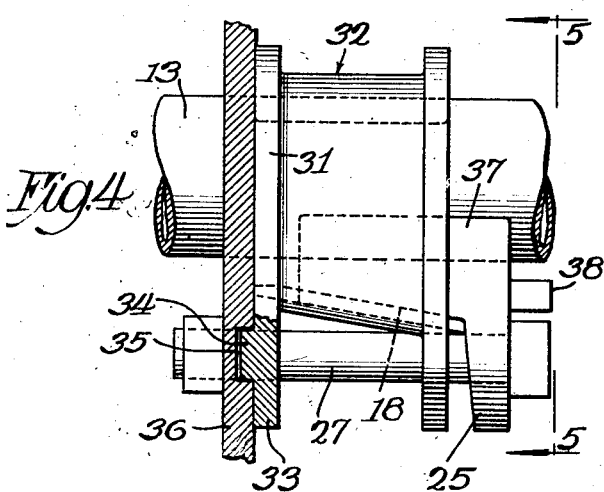
Fig. 4 is a side elevation of a modified form of the anchoring device with parts in section and parts broken away, showing the same in position for use.
Figure 5:
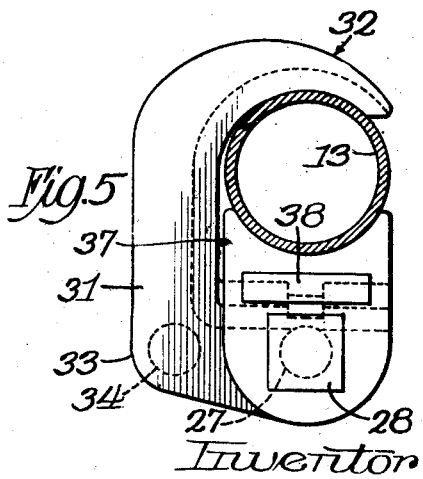
Fig. 5 is a section on the line 5—5 of Fig. 4.

The form of the device shown in Figs. 4 and 5 differs from that described in that means are provided for preventing rotation of the clamping member about the clamping bolt 27 as a pivot. As shown, the inner flange 31 of the clamping member 32 is extended as at 33 and the extension is provided with a lug or projection 34 which is adapted to engage a corresponding recess 35 formed in the support 36. In this construction, the bolt 27 and the lug 34 will cooperate to prevent the rotation of the anchor or clamp member 32 relative to the support 36. In this form of construction, the wedge member 37 is provided with a lug or extension 38 for preventing the rotation of the head of the bolt 27. The lug or projection 38 preferably extends outwardly beyond the head of the bolt so that the wedge may, if desired, be driven into clamping position by a hammer or the like before the nut is tightened on the bolt 27.

I claim as my invention:

1. In a pipe clamp, a body portion, a pair of spaced arms extending laterally from said body portion, the free ends of said arms being spaced apart, one of said arms having a concave surface on its inner side, a wedge member slidably mounted on the inner surface of the other arm, and means for forcing said wedge member along said other arm toward said body portion for clamping a pipe between said wedge member and said concave surface.

2. In a pipe clamp, a body portion, a pair of arms extending laterally from said body portion in spaced relation, the free ends of said arms being spaced apart, one of said arms being provided with a pipe seat, a wedge member associated with the other arm, and means associated with said other arm for forcing a pipe into said seat.

3. In a pipe clamp, a body portion, an arm extending outwardly therefrom and provided with a pipe seat, and spaced from the free end of said arm to form a passage to said seat, a clamping member opposite said seat, and means for moving said member relative to said pipe and body portion for clamping said pipe against said seat.

4. In a pipe clamp, a body portion, a pair of arms extending outwardly from said body portion, one of said arms being provided with a seat for receiving a pipe and the other with an inclined surface opposite said seat, said arms having their free ends spaced apart a distance greater than the diameter of said pipe, a clamping member slidably mounted on said surface, and means for forcing said member along said surface for clamping a pipe against said seat.

5. In a railway car, pipe supports on said car, a brake pipe, clamp members secured to said supports and adapted to support said pipe, each of said members comprising a body portion, a pair of arms extending outwardly from said body portion, one of said arms being provided with a seat for receiving said pipe, a clamping wedge slidably mounted on the other arm, and means for forcing said wedge inwardly toward said body portion for clamping said pipe against said seat, said clamp members having the wedge members of alternate clamps turned in opposite directions for preventing the longitudinal movement of said pipe relative to said car.

6. In a pipe clamp, a body portion, an arm extending laterally from said body portion, said arm being provided with a concave face for forming a seat for receiving a pipe, a wedge member for clamping said pipe against said seat, said wedge member extending longitudinally of said pipe and provided with a concave surface for forming a pipe seat opposite said first named seat, and means for forcing said wedge member into clamping engagement with said pipe, the free end of said arm being spaced from said pipe seat to form a passage whereby said clamp may be attached to and detached from said pipe by a movement laterally of said pipe.

7. In combination, a pipe support, a pipe clamp engaging said support, said clamp comprising a body portion, a pair of arms extending laterally therefrom and having their free ends spaced apart for receiving a pipe between the same, said arms being spaced apart a distance greater than the diameter of said pipe, one of said arms being provided with a pipe seat and the other with an inclined surface, a wedge member having a pipe seat thereon engaging said surface, and a bolt extending through portions of said support, clamp and wedge for clamping said pipe between said seats and for connecting said clamp to said support.

8. In combination, a support, a pipe clamp comprising a body portion provided with spaced apart arms extending laterally therefrom, a pipe seat on one of said arms, an inclined surface on the other of said arms extending transversely thereto, a wedge member having a laterally extending projection slidably engaging said surface and being provided with a pipe seat opposite said first named seat, the free ends of said arm being spaced from said wedge member to form a passage through which a pipe may be introduced to said seats, a tongue and groove connection between said wedge and surface, and a bolt extending through said projection, clamp and support for clamping said pipe and for securing said clamp to said support.

9. In combination, a support, a pipe clamp comprising a body portion having spaced apart arms extending laterally therefrom, reinforcing ribs extending about said body and arms, a pipe seat on one of said arms, an inclined surface on the other of said arms extending transversely thereto, a wedge member slidably engaging said surface and being provided with a pipe seat, the free ends of said arms being spaced apart to form a passage leading to said seats, interconnecting means between said wedge and service for preventing lateral movement of said wedge relative to said surface, a bolt extending through a portion of said wedge, said reinforcing members and said support, and means cooperating with said bolt to prevent rotation of said clamp relative to said support.

In testimony whereof I affix my signature.

SVEN J. STRID.

CERTIFICATE OF CORRECTION.

Patent No. 1,774,678.  Granted September 2, 1930, to

SVEN J. STRID.

It is hereby certified that error appears in the printed specification of the above numbered patent requiring correction as follows: Page 2, lines 81 to 83, claim 3, strike out the phrase "and spaced from the free end of said arm to form a passage to said seat" and insert the same to follow after "seat" in line 83, same claim; page 3, line 23, claim 8, for "ends" read end, and line 42, claim 9, for "service" read surface; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.